US009400839B2

(12) United States Patent
Chang et al.

(10) Patent No.: US 9,400,839 B2
(45) Date of Patent: Jul. 26, 2016

(54) ENHANCED KEYWORD FIND OPERATION IN A WEB PAGE

(71) Applicant: International Business Machines Corporation, Armonk, NY (US)

(72) Inventors: Billy W. Chang, Rockville, MD (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 13/934,891

(22) Filed: Jul. 3, 2013

(65) Prior Publication Data
US 2015/0012810 A1 Jan. 8, 2015

(51) Int. Cl.
*G06F 17/00* (2006.01)
*G06F 17/30* (2006.01)

(52) U.S. Cl.
CPC .... *G06F 17/30716* (2013.01); *G06F 17/30734* (2013.01); *G06F 17/30861* (2013.01); *G06F 17/30905* (2013.01)

(58) Field of Classification Search
CPC .............................................. G06F 17/30861
See application file for complete search history.

(56) References Cited

U.S. PATENT DOCUMENTS

| | | | |
|---|---|---|---|
| 6,862,713 B1 * | 3/2005 | Kraft | G06F 17/30646 704/246 |
| 7,257,588 B2 | 8/2007 | Keith, Jr. et al. | |
| 7,865,530 B2 | 1/2011 | Liu et al. | |
| 8,200,672 B2 * | 6/2012 | Adachi | G06F 17/30867 707/739 |
| 2005/0144162 A1 | 6/2005 | Liang | |
| 2006/0136400 A1 * | 6/2006 | Marr | G06F 17/30867 |
| 2009/0043737 A1 * | 2/2009 | Faris | G06F 17/30864 |
| 2010/0076995 A1 | 3/2010 | Pan et al. | |
| 2010/0205202 A1 | 8/2010 | Yang et al. | |
| 2011/0264444 A1 | 10/2011 | Morisaki | |
| 2012/0232996 A1 | 9/2012 | Scott | |

OTHER PUBLICATIONS

Couch, "4 Browser Extensions for Searching Multiple Words on a Webpage [Chrome, Firefox]", Jun. 4, 2013, p. 1-9.*
The Den, "4 Shortcuts to Find Things Fast with Firefox", Feb. 21, 2013, p. 1-3, available at https://blog.mozilla.org/theden/2013/02/21/4-shortcuts-to-find-things-fast-with-firefox.*
Berendt, et al., "Web Mining: From Web to Semantic Web", EWMF 2003, Invited and Selected Revised papers, p. 1-210.*

(Continued)

*Primary Examiner* — Amelia Tapp
(74) *Attorney, Agent, or Firm* — North Shore Patents, P.C.; Michele Liu Baillie

(57) ABSTRACT

An enhanced find operation on a web page includes: activating an enhanced find operation on a web page and obtaining an entered keyword; obtaining one or more keywords on the web page related to the entered keyword and one or more categories associated with the one or more related keywords; displaying the one or more categories associated with the one or more related keywords with contents of the web page; detecting a selection of one of the one or more categories; and enhancing a display on the web page of the one or more related keywords associated with the selected category. Events for an activation of a find operation on the web page are monitored. In response to detecting the activation of the find operation, the find operation is intercepted, and the enhanced find operation is activated instead.

17 Claims, 4 Drawing Sheets

(56) References Cited

OTHER PUBLICATIONS

Microsoft, "Find text on a webpage in Windows Internet Explorer 9: Applies to Windows 7" p. 1-6, retrieved from http://windows.microsoft.com/en-US/windows7/Find-text-on-a-webpage-in-Internet-Explorer-9 on Sep. 25, 2005.*

Stack Exchange, "How do I search a text keyword in a Facebook Page" asked Oct. 5, 2011, p. 1-3, available at http://webapps.stackexchange.com/questions/19559/how-do-i-search-a-text-keyword-in-a-facebook-page.*

Firefox Add-Ons, "SearchWP 2.5.0" Updated May 13, 2011, p. 1-3, available at https://web.archive.org/web/20110807050825/https://addons.mozilla.org/en-US/firefox/addon/searchwp.*

Kules et al., "From Keyword Search to Exploration: How Result Visualization Aids Discovery on the Web" 2008, p. 1-57.*

Rakshit, et al., "Use of ontology to find category of a selected keyword in a webpage"; U.S. Appl. No. 13/652,985, filed Oct. 16, 2012.

* cited by examiner

ENHANCED KEYWORD FIND OPERATION IN A WEB PAGE

BACKGROUND

A keyword "find" operation in a web page is made available to users by existing browsers, which allows users to find one or more keywords on the web page. In addition to finding exact keyword matches to entered keyword(s), different varieties of find operations are also available, such as finding synonyms of the keywords and nearest keywords. However, sometimes users will wish to find keywords that have a logical or semantic relationship that is not captured by existing keyword find operations. Existing keyword find operations are thus inadequate in these situations.

SUMMARY

According to one embodiment of the present invention, a computer implemented method for providing an enhanced find operation on a web page comprises: activating an enhanced find operation on a web page and obtaining an entered keyword; obtaining one or more keywords on the web page related to the entered keyword and one or more categories associated with the one or more related keywords; displaying the one or more categories associated with the one or more related keywords with contents of the web page; detecting a selection of one of the one or more categories; and enhancing a display on the web page of the one or more related keywords associated with the selected category.

In one aspect of the present invention, the activating of the enhanced find operation on the web page and the obtaining of the entered keyword, comprises: monitoring events for an activation of a find operation on the web page; and in response to detecting the activation of the find operation, intercepting the find operation and instead activating the enhanced find operation.

In one aspect of the present invention, the obtaining of the one or more keywords on the web page related to the entered keyword and the one or more categories associated with the one or more related keywords, comprises: receiving an address for the web page and the entered keyword; searching a storage for the one or more keywords on the web page related to the entered keyword; identifying the one or more categories associated with the one or more related keywords; and returning each related keyword and each associated category.

In one aspect of the present invention, the obtaining of the one or more keywords on the web page related to the entered keyword and the one or more categories associated with the one or more related keywords, comprises: receiving an address for the web page and a partially entered keyword; determining one or more words matching the partially entered keyword; searching a storage for the one or more keywords on the web page related to each of the words matching the partially entered keyword; identifying the one or more categories associated with the one or more related keywords; and returning each related keyword and each associated category.

In one aspect of the present invention, the method further comprises: parsing a plurality of keywords from a plurality of web pages; processing the plurality of keywords using an ontology database to identify relationships among the plurality of keywords; associating a plurality of categories with the plurality of keywords according to the relationships among the plurality of keywords; and storing the plurality of keywords with the plurality of categories associated with the plurality of keywords.

In one aspect of the present invention, the processing of the plurality of keywords using the ontology database to identify relationships among the plurality of keywords is performed prior to the activation of the enhanced find operation.

In one aspect of the present invention, the method further comprises: detecting a selection of a different category of the one or more categories; and in response to detecting the selection of the different category, enhancing a display on the web page of the one or more related keywords associated with the different category.

System and computer program products corresponding to the above-summarized methods are also described and claimed herein.

DETAILED DESCRIPTION

Figure 1:
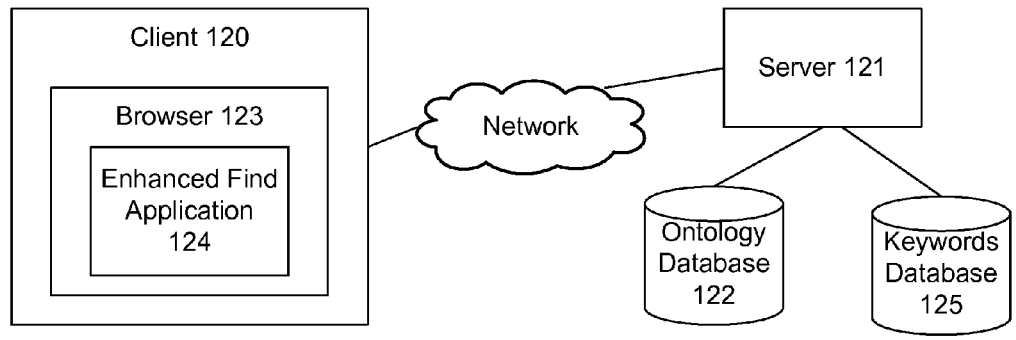
FIG. 1 illustrates an embodiment of a system for providing an enhanced find operation in a web page according to the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an embodiment of a system for providing an enhanced find operation in a web page according to the present invention. The system includes a client 120 coupled to a server 121 over a network, such as the Internet. The client 120 includes a browser 123 for accessing web pages. The browser 123 includes an enhanced find application 124 that provides the enhanced find operation at the client side according to the present invention. For example, the application 124 may be a plugin to the browser 123. The application 124 communicates with a server 121, which has access to an ontology database 122 and a keywords database 125 storing keywords on web pages and categories of the relationships among the keywords.

Figure 2:
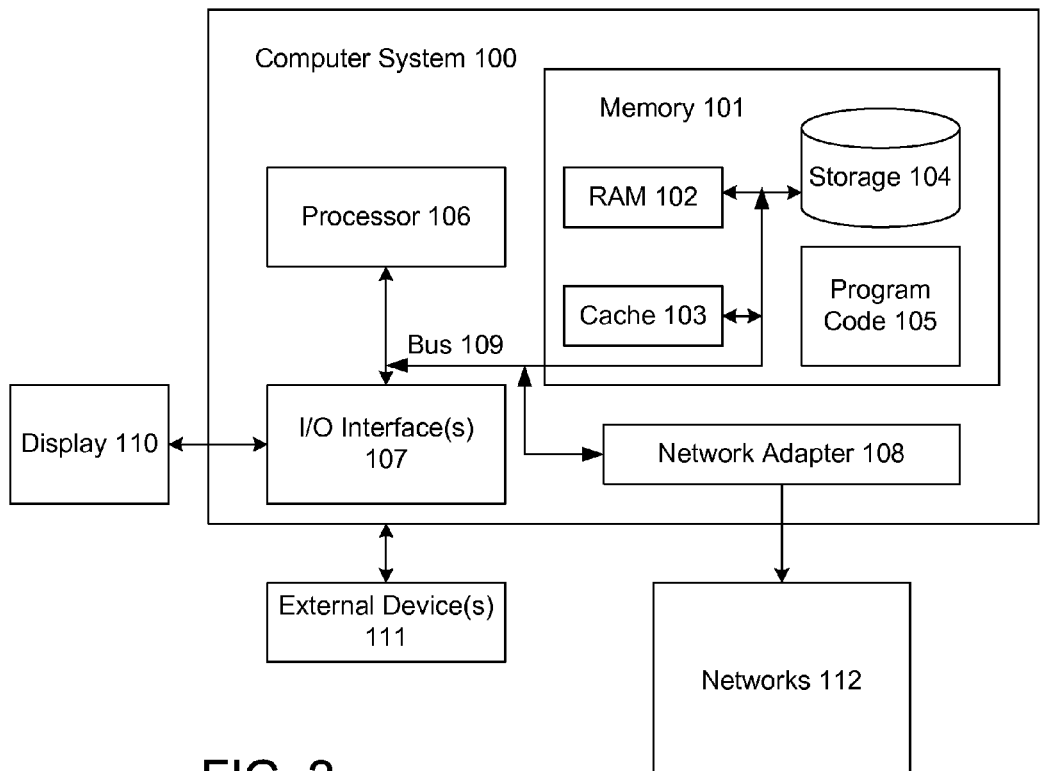
FIG. 2 illustrates an embodiment of a computer system according to the present invention.

In this embodiment, the client 120 and the server 121 are computer systems, such as the computer system 100 illustrated in FIG. 2. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more networks 112 via network adapter 108.

Figure 3:
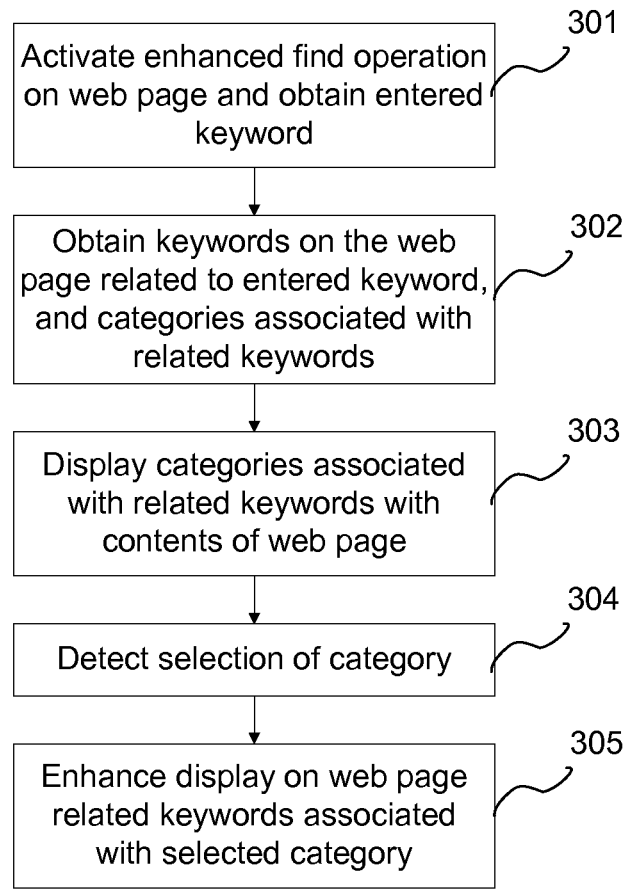
FIG. 3 is a flowchart illustrating an embodiment of a method for providing an enhanced find operation in a web page according to the present invention.

FIG. 3 is a flowchart illustrating an embodiment of a method for providing an enhanced find operation in a web page according to the present invention. First, the enhanced find operation on a web page is activated, and the entered keyword is obtained (301). For example, the find operation may be activated by a user entering a keyword into a "find" field on the browser 123. In response to the activation of the enhanced find operation, one or more keywords on the web page that are related to the entered keyword, and one or more categories associated with the related keywords, are obtained (302). In this embodiment, the related keywords are categorized or grouped according to their respective relationship with the entered keyword. The one or more categories associated with the related keywords are then displayed (303) with the contents of the web page. In response to detecting a selection of one of the categories (304), the display of the related keywords associated with the selected category is enhanced on the web page (305). For example, assume that a user enters Company Name in the find field on the browser 123, meaning the user is trying to find Company Name on the web page. Assume that the contextual categorization of keywords on the web page related to Company Name includes Competitors, Products, etc. These categories are displayed with the contents of the web page. When the user selects the Competitors category, the display of related keywords associated with the Competitors category are enhanced.

In one embodiment, a service provider at the server 121 parses keywords from a plurality of web pages. The ontology database 122 is used to process the keywords to identify the relationships among them and to build list of categories to associate with related keywords according to their relationships. In one embodiment, the processing of the keywords is performed before the activation of the enhanced find operation. Alternatively, assuming sufficient processing power and communication speed, the processing may be performed after activation of the enhanced find operation. The keywords and the categories are indexed and stored at the server 121 in the keywords database 125. In one embodiment, a centralized ontology database is used to categorize the relationships. A customized ontology database, such as one for a specific industry or company, may also be used instead or in combination.

In one embodiment, upon the initial loading of the browser 123, the application 124 identifies the server 121 that will provide the enhanced find operation service. When the enhanced find operation is activated (301), the application 124 sends the web page address and the entered keyword to the server 121. In response to receiving the web page address and the entered keyword, the server 121 searches the keywords database 125 for one or more keywords on the web page that are related to the entered keyword. The server 121 also identifies the categories associated with the related keywords. The related keywords and the associated categories are then sent to the application 124.

In one embodiment, the entire entered keyword is sent to the server 121, and the server 121 returns the related keywords and the associated categories as part of the rendering of the web page contents. In another embodiment, the entering of the keyword is detected one letter at a time, and one letter at a time is submitted to the server 121. The server 121 returns possible matching related keywords and associated categories with the partial entered keywords as each letter is received, in order to provide a "type ahead" experience to the user. When multiple sets of possible categories are returned, the sets may be prioritized according to relevance, popularity, or some other parameter.

Alternatively, upon navigation to the web page, the application 124 may send the web page address to the server 121, which returns all possible related keywords and associated categories for the web page. This information is then stored locally at the client 120. When the enhanced find operation is activated, the application 124 uses the locally stored information to obtain the related keywords and associated categories for an entered keyword. This embodiment may be used to provide the enhanced find operation in an offline mode.

In one embodiment, the activation of the enhanced find operation may be detected by monitoring browser events by the application 124. For example, a user may indicate use of the find operation by entering CTRL+F or by placing the cursor in the find field on the browser 123. The applicant 124 intercepts the find operation event and activates the enhanced find operation instead.

Figure 4A:
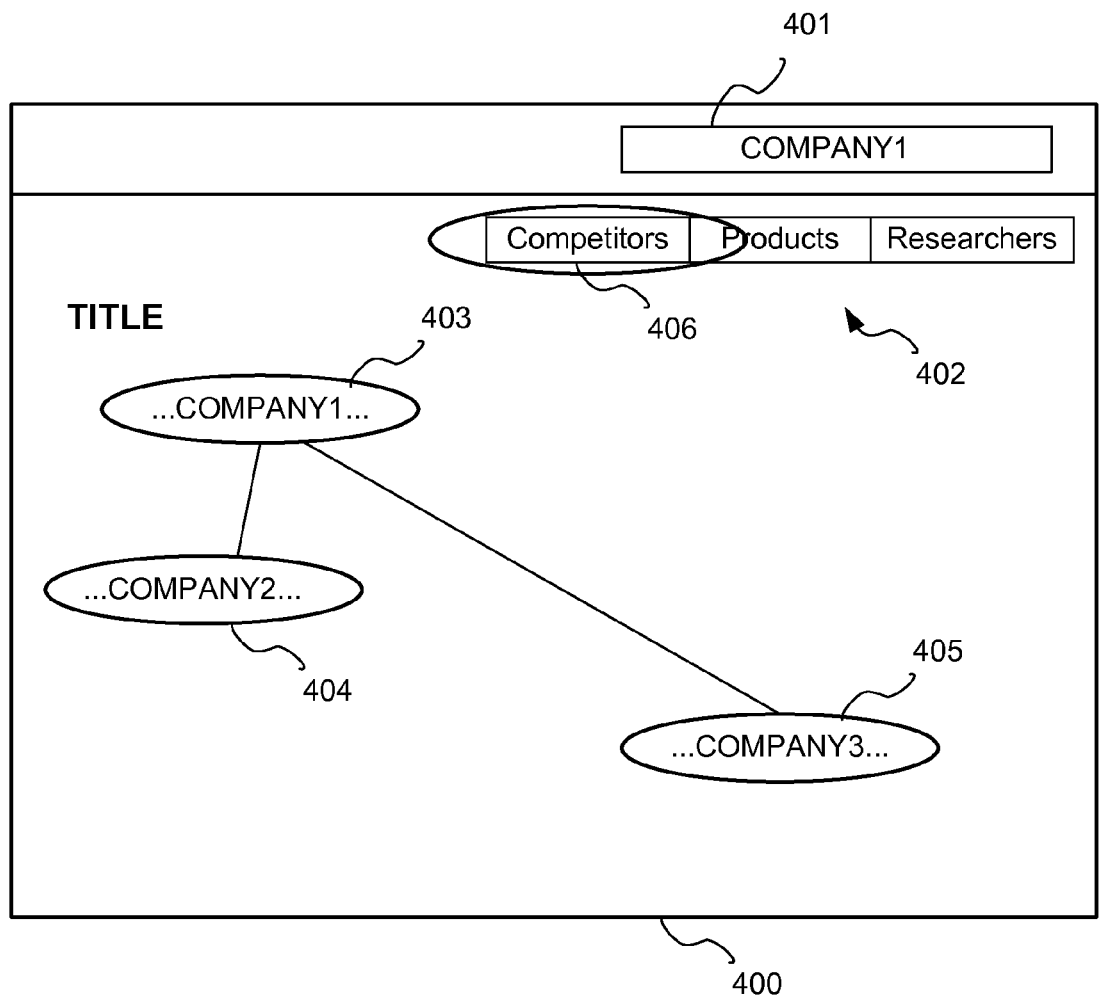
FIGS. 4A and 4B illustrate examples of the enhanced find operation according to an embodiment of the present invention.
Figure 4B:
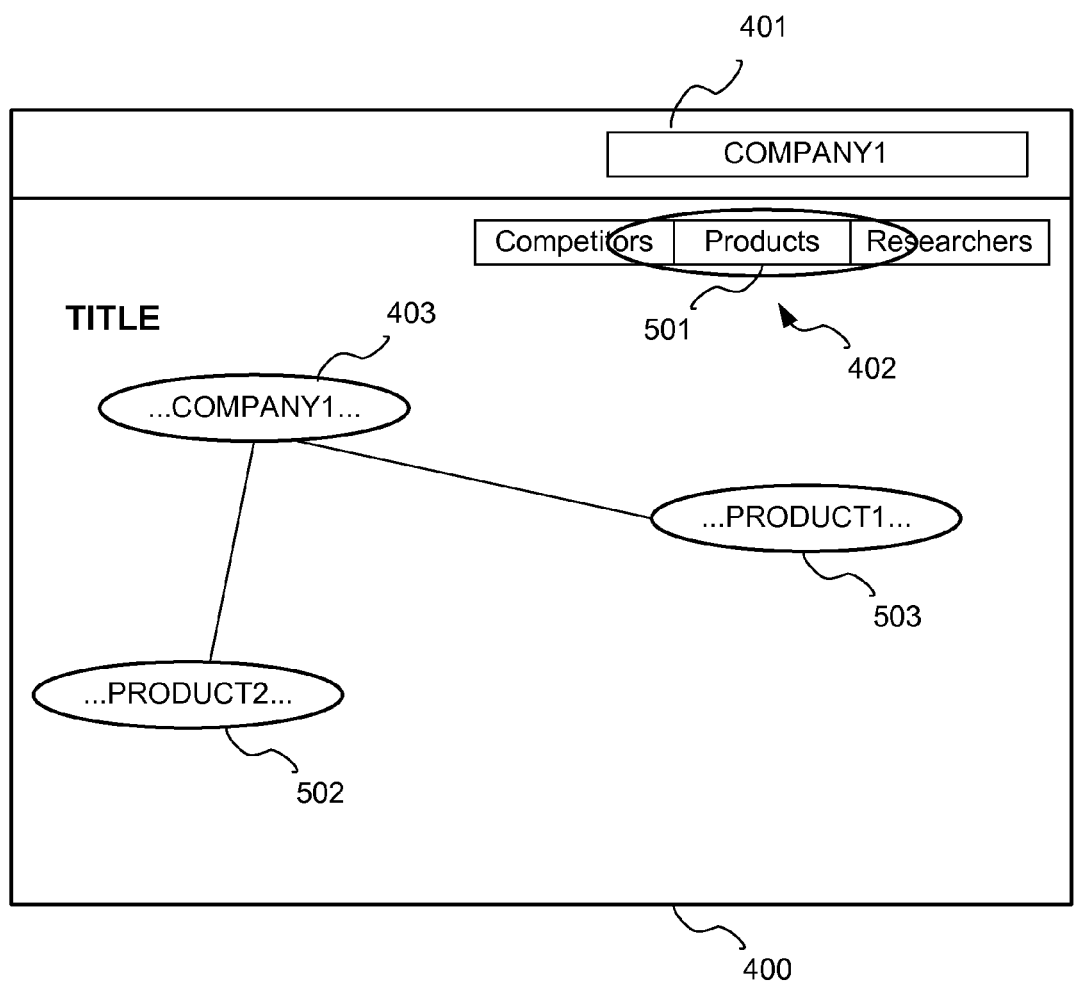

FIGS. 4A and 4B illustrate examples of the enhanced find operation according to an embodiment of the present invention. FIGS. 4A and 4B illustrate a browser 400 displaying a web page. The browser 400 includes a find bar with a find field 401 into which a user may enter a keyword to be found on the web page. Assume in this example that the user wishes to find the keyword 'COMPANY1' on the web page. The user would either enter CTRL+F or place the cursor in the find field 401. The application 124 detects the CTRL+F or the placement of the cursor in the find field 401, intercepts the find operation, and activates the enhanced find operation instead (301). The web page address and the entered keyword 'COMPANY1' are sent to the server 121. The server 121 searches its keywords database 125 for keywords in the web page related to 'COMPANY1'. Assume that the server 121 finds related keywords associated with the categories of 'Competitors', 'Products', and 'Researchers'. For example, in the 'Competitors' category, the related keywords may include 'COMPANY2' and 'COMPANY3'. In the 'Products' category, the related keywords may include 'PRODUCT1' and 'PRODUCT2'. The application 124 obtains these related keywords and the associated categories from the server 121 (302). As illustrated in FIGS. 4A and 4B, the categories 'Competitors', 'Products', and 'Researchers' 402 are rendered as tabs with the web page content and displayed (303).

As illustrated in FIG. 4A, assume that the selection of the 'Competitors' category 406 is detected (304). In response to the selection of the 'Competitors' category 406, the display of the related keywords in the web page associated with this category, i.e., 'COMPANY2' 404 and 'COMPANY3' 405, are enhanced (305). In this example, the display of the entered keyword 403, the related keywords 404-405, and the selected category 406 are enhanced with visual cues, such as the highlighting of text. The display of the keywords may further be enhanced by visual linkages between the entered keyword 403 and the related keywords 404-405. In this manner, not only is the user shown where 'COMPANY1' may be found on the web page, but the user is also shown where the competitors of COMPANY1 may be found on the same web page. The visual linkages convey that the COMPANY2 and COMPANY3 are competitors of COMPANY1.

As illustrated in FIG. 4B, assume that the user changes the category selection to 'Products' 501 (304). In response to the selection of the 'Products' category 501, the display of the related keywords in the web page associated with this category, i.e., 'PRODUCT1' 503 and 'PRODUCT2' 502, are enhanced (305). The enhancement of the Competitors category 406 is removed, and the display of the selected category 501 is enhanced. The enhanced display of the entered keyword 403 remains. The enhancements of the related keywords 404-405 are removed. The display of the related keywords 502 and 503 are enhanced by highlighting the keywords 502-503 and by visual linkages between the entered keyword 403 and the related keywords 502-503. In this manner, not only is the user shown where 'COMPANY1' may be found on the web page, but the user is also shown where the products of COMPANY1 may be found on the same web page. The visual linkages convey that PRODUCT 1 and PRODUCT 2 are products of COMPANY1.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, comprising:
    activating an enhanced find operation on a web page and obtaining an entered keyword to find in the contents of the web page;
    obtaining one or more keywords in the contents of the web page related to the entered keyword and one or more categories associated with the one or more related keywords;
    displaying the one or more categories associated with the one or more related keywords with the contents of the web page;
    detecting a selection of at least one of the one or more categories; and
    enhancing a display in the contents of the web page of the one or more related keywords associated with the selected category,
    wherein the detecting of the selection of the at least one of the one or more categories and the enhancing of the display in the contents of the web page of the one or more related keywords associated with the selected category comprise:
        detecting a selection of a first category of the one or more categories;
        enhancing a display in the contents of the web page of a first set of keywords associated with the first category;
        detecting a selection of a second category of the one or more categories;
        in response to detecting the selection of the second category, removing the enhanced display of the first set of keywords and enhancing a display in the contents of the web page of a second set of keywords associated with the second category.

2. The method of claim 1, wherein the activating of the enhanced find operation on the web page and the obtaining of the entered keyword, comprises:
    monitoring events for an activation of a find operation on the web page; and
    in response to detecting the activation of the find operation, intercepting the find operation and instead activating the enhanced find operation.

3. The method of claim 1, wherein the obtaining of the one or more keywords in the contents of the web page related to the entered keyword and the one or more categories associated with the one or more related keywords, comprises:
    receiving an address for the web page and the entered keyword;
    searching a storage for the one or more keywords in the contents of the web page related to the entered keyword;
    identifying the one or more categories associated with the one or more related keywords; and
    returning each related keyword and each associated category.

4. The method of claim 1, wherein the obtaining of the one or more keywords on the web page related to the entered keyword and the one or more categories associated with the one or more related keywords, comprises:
    receiving an address for the web page and a partially entered keyword;
    determining one or more words matching the partially entered keyword;
    searching a storage for the one or more keywords in the contents of the web page related to each of the words matching the partially entered keyword;
    identifying the one or more categories associated with the one or more related keywords; and
    returning each related keyword and each associated category.

5. The method of claim 1, further comprising:
    parsing a plurality of keywords from a plurality of web pages;
    processing the plurality of keywords using an ontology database to identify relationships among the plurality of keywords;
    associating a plurality of categories with the plurality of keywords according to the relationships among the plurality of keywords; and
    storing the plurality of keywords with the plurality of categories associated with the plurality of keywords.

6. The method of claim 5, wherein the processing of the plurality of keywords using the ontology database to identify relationships among the plurality of keywords is performed prior to the activation of the enhanced find operation.

7. A computer program product for providing an enhanced find operation on a web page, the computer program product comprising:
    a non-transitory computer readable storage medium having computer readable program code embodied therewith, the program code executable by a processor to:
        activate an enhanced find operation on a web page and obtain an entered keyword to find in the contents of the web page;
        obtain one or more keywords in the contents of the web page related to the entered keyword and one or more categories associated with the one or more related keywords;
        display the one or more categories associated with the one or more related keywords with the contents of the web page;

detect a selection of at least one of the one or more categories; and enhance a display in the contents of the web page of the one or more related keywords associated with the selected category, wherein the program code executable by the processor to detect the selection of the at least one of the one or more categories and to enhance the display in the contents of the web page of the one or more related keywords associated with the selected category is further executable by the processor to:

detect a selection of a first category of the one or more categories;

enhance a display in the contents of the web page of a first set of keywords associated with the first category;

detect a selection of a second category of the one or more categories;

in response to detecting the selection of the second category, remove the enhanced display of the first set of keywords and enhance a display in the contents of the web page of a second set of keywords associated with the second category.

8. The computer program product of claim 7, wherein the program code executable by the processor to activate the enhanced find operation on the web page and to obtain the entered keyword, is further executable by the processor to:

monitor events for an activation of a find operation on the web page; and in response to detecting the activation of the find operation, intercept the find operation and instead activating the enhanced find operation.

9. The computer program product of claim 7, wherein the program code executable by the processor to obtain the one or more keywords in the contents of the web page related to the entered keyword and the one or more categories associated with the one or more related keywords, is further executable by the processor to:

receive an address for the web page and the entered keyword;

search a storage for the one or more keywords in the contents of the web page related to the entered keyword;

identify the one or more categories associated with the one or more related keywords; and return each related keyword and each associated category.

10. The computer program product of claim 7, wherein the computer readable program code executable by the processor to obtain the one or more keywords in the contents of the web page related to the entered keyword and the one or more categories associated with the one or more related keywords is further executable by the processor to:

receive an address for the web page and a partially entered keyword;

determine one or more words matching the partially entered keyword;

search a storage for the one or more keywords in the contents of the web page related to each of the words matching the partially entered keyword;

identify the one or more categories associated with the one or more related keywords; and return each related keyword and each associated category.

11. The computer program product of claim 7, wherein the program code is further executable by the processor to:

parse a plurality of keywords from a plurality of web pages;

process the plurality of keywords using an ontology database to identify relationships among the plurality of keywords;

associate a plurality of categories with the plurality of keywords according to the relationships among the plurality of keywords; and store the plurality of keywords with the plurality of categories associated with the plurality of keywords.

12. The computer program product of claim 11, wherein the program code executable by the processor to process the plurality of keywords using the ontology database to identify relationships among the plurality of keywords is executed by the processor prior to the activation of the enhanced find operation.

13. A system comprising:

a processor; and a computer readable storage medium having computer readable program code embodied therewith, the program code executable by the processor to:

activate an enhanced find operation on a web page and obtain an entered keyword to find in the contents of the web page;

obtain one or more keywords in the contents of the web page related to the entered keyword and one or more categories associated with the one or more related keywords;

display the one or more categories associated with the one or more related keywords with the contents of the web page;

detect a selection of at least one of the one or more categories; and enhance a display in the contents of the web page of the one or more related keywords associated with the selected category, wherein the program code executable by the processor to detect the selection of the at least one of the one or more categories and to enhance the display in the contents of the web page of the one or more related keywords associated with the selected category is further executable by the processor to:

detect a selection of a first category of the one or more categories;

enhance a display in the contents of the web page of a first set of keywords associated with the first category;

detect a selection of a second category of the one or more categories;

in response to detecting the selection of the second category, remove the enhanced display of the first set of keywords and enhance a display in the contents of the web page of a second set of keywords associated with the second category.

14. The system of claim 13, wherein the program code executable by the processor to activate the enhanced find operation on the web page and to obtain the entered keyword, is further executable by the processor to:

monitor events for an activation of a find operation on the web page; and in response to detecting the activation of the find operation, intercept the find operation and instead activating the enhanced find operation.

15. The system of claim 13, wherein the program code executable by the processor to obtain the one or more keywords in the contents of the web page related to the entered keyword and the one or more categories associated with the one or more related keywords, is further executable by the processor to:

receive an address for the web page and the entered keyword;

search a storage for the one or more keywords in the contents of the web page related to the entered keyword;

identify the one or more categories associated with the one or more related keywords; and return each related keyword and each associated category.

16. The system of claim 13, wherein the computer readable program code executable by the processor to obtain the one or more keywords in the contents of the web page related to the entered keyword and the one or more categories associated with the one or more related keywords is further executable by the processor to:

receive an address for the web page and a partially entered keyword;

determine one or more words matching the partially entered keyword;

search a storage for the one or more keywords in the contents of the web page related to each of the words matching the partially entered keyword;

identify the one or more categories associated with the one or more related keywords; and return each related keyword and each associated category.

17. The system of claim 13, wherein the program code is further executable by the processor to:

parse a plurality of keywords from a plurality of web pages;

process the plurality of keywords using an ontology database to identify relationships among the plurality of keywords;

associate a plurality of categories with the plurality of keywords according to the relationships among the plurality of keywords; and store the plurality of keywords with the plurality of categories associated with the plurality of keywords.

* * * * *